US011592558B2

(12) United States Patent
El Amili et al.

(10) Patent No.: US 11,592,558 B2
(45) Date of Patent: Feb. 28, 2023

(54) TIME OF FLIGHT LIDAR SYSTEM USING COHERENT DETECTION SCHEME

(71) Applicant: GM Cruise Holdings LLC, San Francisco, CA (US)

(72) Inventors: Abdelkrim El Amili, Arcadia, CA (US); Jacob Levy, Sierra Madre, CA (US); Scott Singer, San Gabriel, CA (US); Vala Fathipour, Pasadena, CA (US); Ayan Chakrabarty, Glendora, CA (US); Kamel Benboudjema, Pasadena, CA (US); Richard Kalantar Ohanian, Glendale, CA (US); David Lew, Arcadia, CA (US); George Keseyan, Los Angeles, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 360 days.

(21) Appl. No.: 16/876,545

(22) Filed: May 18, 2020

(65) Prior Publication Data
US 2021/0356588 A1 Nov. 18, 2021

(51) Int. Cl.
*G01S 17/10* (2020.01)
*G01S 17/88* (2006.01)
*G05D 1/02* (2020.01)
*G01S 7/4865* (2020.01)
(Continued)

(52) U.S. Cl.
CPC .............. *G01S 17/10* (2013.01); *G01S 7/487* (2013.01); *G01S 7/4861* (2013.01); *G01S 7/4865* (2013.01); *G01S 17/88* (2013.01); *G05D 1/024* (2013.01)

(58) Field of Classification Search
CPC ...... G01S 17/10; G01S 7/4861; G01S 7/4865; G01S 7/487; G01S 17/88; G01S 7/4812; G01S 17/14; G01S 17/931; G05D 1/024
See application file for complete search history.

(56) References Cited

U.S. PATENT DOCUMENTS 10,802,120 B1 * 10/2020 LaChapelle ........... G01S 7/4917
2011/0292371 A1 * 12/2011 Chang .................... G01S 7/486
356/28

(Continued)

*Primary Examiner* — Thanh Luu
*Assistant Examiner* — Monica T Taba
(74) *Attorney, Agent, or Firm* — Calfee, Halter & Griswold LLP

(57) ABSTRACT

Various technologies described herein pertain to a time of flight lidar sensor system that uses a coherent detection scheme. The lidar sensor system includes a laser source, a semiconductor optical amplifier, a combiner, and a balanced detector. The laser source emits an input optical signal. The semiconductor optical amplifier receives a first portion of the input optical signal and outputs a modulated optical signal (amplified and modulated). The combiner receives a second portion of the input optical signal and a returned optical signal received responsive to transmission of at least a portion of the modulated optical signal. The combiner coherently mixes the second portion of the input optical signal with the returned optical signal and outputs mixed optical signals. The balanced detector detects the mixed optical signals and generates an output signal (e.g., a differential photocurrent), which can be used to detect a distance to a target.

20 Claims, 8 Drawing Sheets

(51) Int. Cl.
G01S 7/487 (2006.01)
G01S 7/4861 (2020.01)

(56) References Cited

U.S. PATENT DOCUMENTS

2021/0055388 A1* 2/2021 Feng .................. G01S 17/58
2021/0141067 A1* 5/2021 Haraguchi ............ G01S 7/487

* cited by examiner

TIME OF FLIGHT LIDAR SYSTEM USING COHERENT DETECTION SCHEME

BACKGROUND

Autonomous vehicles are currently in development, where an autonomous vehicle includes various sensor systems that output sensor signals as well as a computing system that controls operation of the autonomous vehicle based upon the sensor signals outputted by the sensor systems. The sensor systems of the autonomous vehicle may include a lidar sensor system configured to generate a three-dimensional point cloud of surroundings of the autonomous vehicle. Points in the point cloud represent distances between the lidar sensor system and objects in a field of view of the lidar sensor system. A conventional lidar sensor system typically includes a laser source that emits an optical signal that is transmitted into an environment nearby the lidar sensor system and a photodetector that detects a returned optical signal, where the returned optical signal is based upon the optical signal reflecting from an object in the environment nearby the lidar sensor system. Based upon a parameter of the returned optical signal, a distance between that the lidar sensor system and the object can be computed. The computing system of the autonomous vehicle can control operation of the autonomous vehicle based upon the computed distance.

Some autonomous vehicles include time of flight lidar sensor systems. As noted above, an optical signal can be transmitted into the environment and a returned optical signal can be detected by the lidar sensor system. A time of flight lidar sensor system can measure a time duration for a light pulse (e.g., the optical signal) to propagate through a medium, reflect off the object, and return back to the lidar sensor system through the medium. A distance to the object that reflects the light pulse from the lidar sensor system can be determined based on the time duration (e.g., a path length for the propagation can be determined based on the time duration and a speed of light in the medium).

Conventional time of flight lidar sensor systems commonly rely on a direct detection scheme in which a returned optical signal reflected from a target is to be larger than a noise equivalent power of photodetector(s) utilized for detecting the returned optical signal. For long-range detection sensitivity, traditional time of flight lidar sensor systems commonly include avalanche photodiodes (APDs) and transmit optical signals at relatively high optical power. However, APDs may be noisy, which can detrimentally impact conventional time of flight lidar sensor systems. Moreover, it may be desirable to reduce background light noise, size, weight, power consumption, and cost of lidar sensor systems for various autonomous vehicle applications.

By way of illustration, it may be difficult to detect a low signal level of a returned optical signal with conventional time of flight lidar sensor systems that include APDs, since the signal level may not be above a noise level of the APDs. Thus, objects located at farther distances from the lidar sensor systems may not be able to be detected utilizing conventional time of flight lidar sensor systems, since the objects that are at the farther distances may return lower levels of signal (compared to objects at closer distances), which can make it more difficult to detect the objects at the farther distances. The foregoing can limit the range able to be detected with conventional time of flight lidar sensor systems.

SUMMARY

The following is a brief summary of subject matter that is described in greater detail herein. This summary is not intended to be limiting as to the scope of the claims.

Described herein are various technologies that pertain to a time of flight lidar sensor system that uses a coherent detection scheme. The lidar sensor system can include a laser source configured to emit an input optical signal. An intensity of the input optical signal emitted by the laser source can be unmodulated. Moreover, the lidar sensor system can include a semiconductor optical amplifier configured to receive a first portion of the input optical signal and output a modulated optical signal. The semiconductor optical amplifier can amplify and modulate the first portion of the input optical signal to output the modulated optical signal. The lidar sensor system can further include a combiner configured to receive a second portion of the input optical signal (e.g., a local oscillator) and a returned optical signal received responsive to transmission of at least a portion of the modulated optical signal. The combiner can be configured to coherently mix the second portion of the input optical signal with the returned optical signal. Further, the combiner can be configured to output mixed optical signals. Moreover, the lidar sensor system can include a balanced detector configured to detect the mixed optical signals and generate an output signal. The output signal, for instance, can be a differential photocurrent. A distance from the lidar sensor system to a target that reflects the modulated optical signal (and causes the returned optical signal to be received by the lidar sensor system) can be detected based on the output signal generated by the balanced detector; thus, as opposed to conventional lidar sensor systems that directly detect a returned optical signal (e.g., using APDs), the lidar sensor system described herein employs a coherent detection scheme (e.g., which can enhance sensitivity as compared to such conventional lidar sensor systems).

According to various embodiments, the lidar sensor system can further include a timing system configured to measure a time of flight based at least in part on the output signal generated by the balanced detector. The lidar sensor system can also include processing circuitry configured to determine a distance to a target in an environment (e.g., from the lidar sensor system) based on the time of flight measured by the timing system.

Pursuant to various embodiments, the lidar sensor system can further include a pulse generator configured to apply a pulsed signal to the semiconductor optical amplifier to modulate a gain of the semiconductor optical amplifier. According to various examples, a timing system of the lidar sensor system can start a measurement of a time of flight based on the pulsed signal from the pulse generator and can stop the measurement of the time of flight based on the output signal generated by the balanced detector. In accordance with other examples, the lidar sensor system can further include a photodetector which can receive a second portion of the modulated optical signal outputted by the semiconductor optical amplifier. Following these examples, the photodetector can be triggered by the second portion of the modulated optical signal to cause a timing system of the lidar sensor system to start a measurement of the time of flight. Moreover, the timing system can stop the measurement of the time of flight based on the output signal generated by the balanced detector.

In accordance with various embodiments, the lidar sensor system can include an integrated circuit. The integrated circuit can include the laser source, the semiconductor optical amplifier, the combiner, and the balanced detector. Moreover, in some embodiments, the integrated circuit can further include the pulse generator; yet, in other embodiments, it is contemplated that the pulse generator can be separate from the integrated circuit.

In accordance with various embodiments, the lidar sensor system can further include a controllable beam splitter. The controllable beam splitter can be configured to split the input optical signal received from the laser source into the first portion of the input optical signal and the second portion of the input optical signal. The first portion of the input optical signal can be provided from the controllable beam splitter to the semiconductor optical amplifier, and the second portion of the input optical signal (e.g., the local oscillator) can be provided from the controllable beam splitter to the combiner. The controllable beam splitter can control a power level of the first portion of the input optical signal (e.g., a trigger power) and a power level of the second portion of the input optical signal (e.g., local oscillator power).

According to various embodiments, an autonomous vehicle can include the lidar sensor system described herein. Operation of the autonomous vehicle can be controlled based on a point cloud generated using the lidar sensor system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 2:
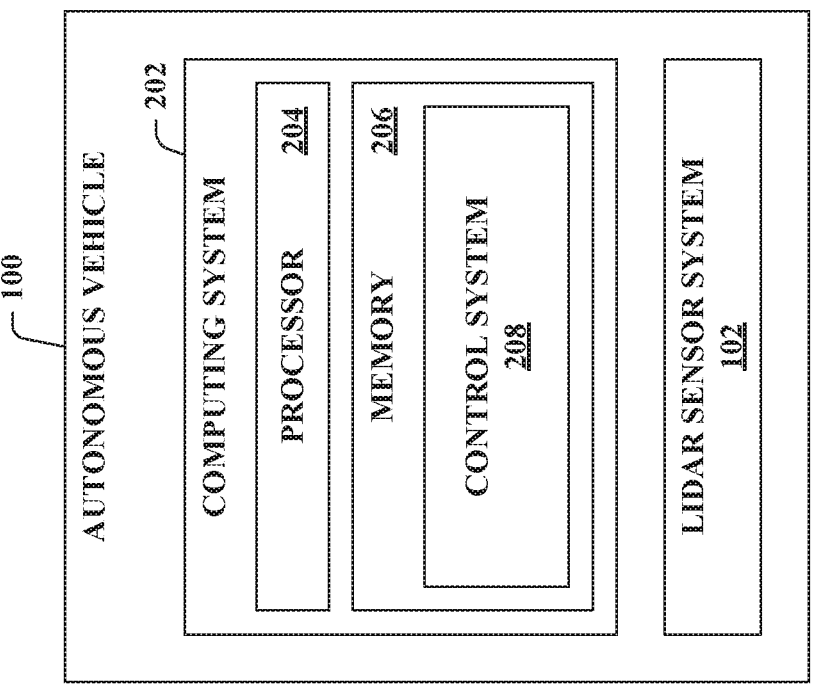
FIG. 2 illustrates a block diagram of an exemplary autonomous vehicle.

Various technologies pertaining to a time of flight lidar sensor system that uses a coherent detection scheme are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "exemplary" is intended to mean "serving as an illustration or example of something."

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As used herein, and unless the context dictates otherwise, the term "coupled to" is intended to include both direct coupling (in which two elements that are coupled to each other contact each other) and indirect coupling (in which at least one additional element is located between the two elements).

Figure 1:
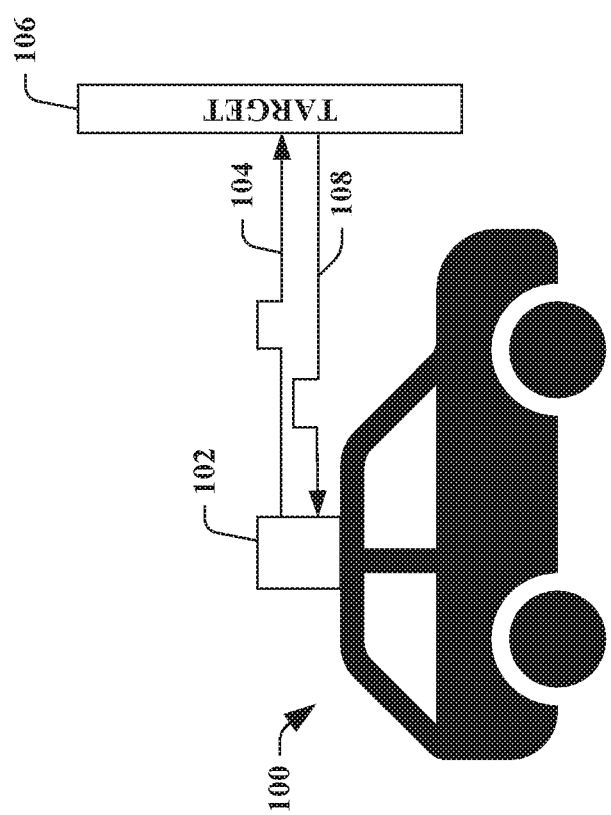
FIG. 1 illustrates an exemplary autonomous vehicle in an environment.

Referring now to the drawings, FIG. 1 illustrates an exemplary autonomous vehicle 100 in an environment. The autonomous vehicle 100 includes a lidar sensor system 102. The lidar sensor system 102 is a time of flight lidar sensor system. The lidar sensor system 102 can be a spinning lidar sensor system or a scanning lidar sensor system. The lidar sensor system 102 emits a modulated optical signal 104 into the environment nearby the autonomous vehicle 100. As shown in the example of FIG. 1, the modulated optical signal 104 impacts a target 106, which may be stationary or moving relative to the autonomous vehicle 100, resulting in a returned optical signal 108 being returned to the lidar sensor system 102. The lidar sensor system 102 can detect the returned optical signal 108 using a coherent detection scheme as described in greater detail herein.

Based on a time of flight of a light pulse of the modulated optical signal 104 emitted by the lidar sensor system 102 propagating to the target 106, reflecting off of the target 106, and returning to the lidar sensor system 102 as part of the returned optical signal 108, the lidar sensor system 102 can compute a distance to the target 106 relative to the lidar sensor system 102. The lidar sensor system 102 can repeat this process for several emitted modulated optical signals directed to different spatial regions around the autonomous vehicle 100, such that the lidar sensor system 102 can generate a three-dimensional point cloud, wherein a point in the point cloud represents a distance between the lidar sensor system 102 and a target (e.g., the target 106). Moreover, as described in greater detail below, the autonomous vehicle 100 can include a computing system that can receive point clouds outputted by the lidar sensor system 102, as well as outputs of other sensor systems, wherein the computing system can control operation of the autonomous vehicle 100 based on the point clouds outputted by the lidar sensor system 102. For example, the computing system can control a propulsion system, a braking system, and/or a steering system of the autonomous vehicle 100 based upon the point clouds outputted by the lidar sensor system 102.

Now turning to FIG. 2, illustrated is a block diagram of the autonomous vehicle 100 according to various aspects. The autonomous vehicle 100 includes the lidar sensor system 102 and a computing system 202. The computing system 202 includes a processor 204 and memory 206, where the memory 206 has a control system 208 loaded therein. The control system 208 can be configured to control operation of the autonomous vehicle 100. For instance, the autonomous vehicle 100 can include various mechanical systems (not shown) that are used to effectuate appropriate motion of the autonomous vehicle 100. The mechanical systems can include, for example, a propulsion system, a braking system, and a steering system.

The computing system 202 can receive a point cloud outputted by the lidar sensor system 102. Moreover, the control system 208 can control operation of the autonomous vehicle 100 based upon such point cloud (e.g., the control system 208 can control the mechanical systems of the autonomous vehicle 100). For example, the control system 208 can cause the autonomous vehicle 100 to accelerate or decelerate based upon the point cloud outputted by the lidar sensor system 102, can cause the autonomous vehicle 100 to change direction based upon the point cloud outputted by the lidar sensor system 102, can cause the autonomous vehicle 100 to remain stationary based upon the point cloud outputted by the lidar sensor system 102, etc.

While not shown, it is contemplated that the autonomous vehicle 100 can include various types of sensor systems in addition to the lidar sensor system 102 (e.g., radar sensor system, camera sensor system, sonar sensor system, infrared sensor system). Accordingly, the control system 208 can further control operation of the autonomous vehicle 100 based upon outputs from the other types of sensor systems.

Figure 3:
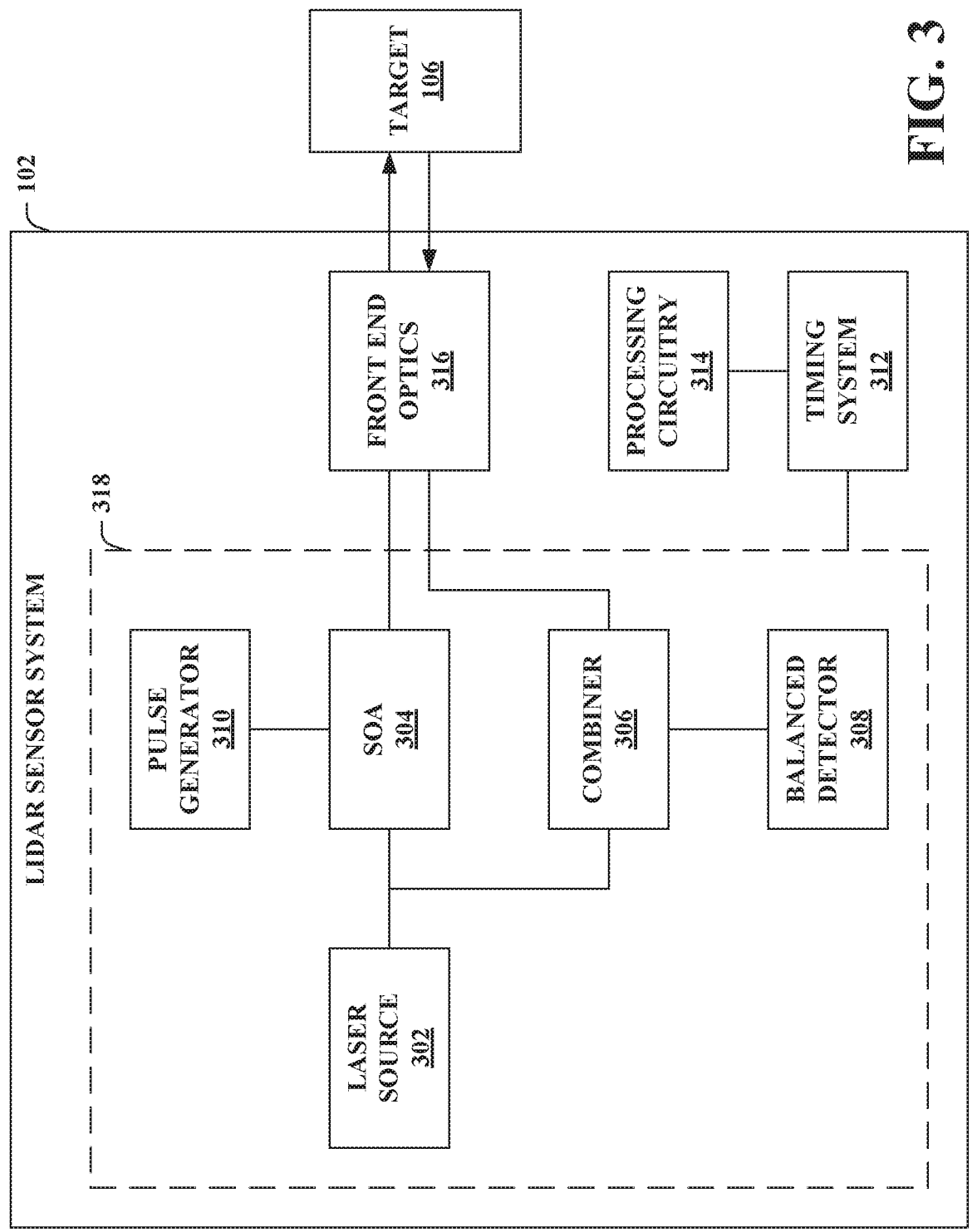
FIG. 3 illustrates a block diagram of an exemplary lidar sensor system.

Now turning to FIG. 3, illustrated is a block diagram of an exemplary embodiment of the lidar sensor system 102. As described herein, the lidar sensor system 102 can transmit a modulated optical signal (e.g., including pulse(s)) that can impact the target 106, causing a returned optical signal to be returned to the lidar sensor system 102. A distance to the target 106 from the lidar sensor system 102 can be determined using a coherent detection scheme based on the returned optical signal, as described below in greater detail.

The lidar sensor system 102 includes a laser source 302 configured to emit an input optical signal. The laser source 302 can be a continuous wave (CW) semiconductor laser that can generate the input optical signal. An intensity of the input optical signal emitted by the laser source 302 can be unmodulated. According to various examples, the laser source 302 can be a distributed feedback (DFB) laser, a distributed Bragg reflector (DBR) laser, a Fabry Perot laser, or the like. Further, the input optical signal emitted by the laser source 302 can be split (e.g., into a first portion and a second portion as noted below). For instance, the laser source 302 can be coupled to a waveguide, which can split the input optical signal.

Moreover, the lidar sensor system 102 includes a semiconductor optical amplifier (SOA) 304 configured to receive a first portion of the input optical signal and output a modulated optical signal. The semiconductor optical amplifier 304 can amplify and modulate the first portion of the input optical signal to output the modulated optical signal. Accordingly, the laser source 302 (e.g., a continuous wave source) can seed the semiconductor optical amplifier 304. Further, a gain of the semiconductor optical amplifier 304 can be modulated through current injection. The semiconductor optical amplifier 304 can simultaneously provide optical amplification and modulation. Pursuant to various embodiments, the modulated optical signal (or a portion thereof) can be transmitted into an environment from the lidar sensor system 102. However, in other embodiments, it is contemplated that the modulated optical signal (or a portion thereof) outputted by the semiconductor optical amplifier 304 can be further amplified (e.g., by an amplifier (not shown) separate from the semiconductor optical amplifier 304) prior to being transmitted from the lidar sensor system 102; thus, examples herein that describe transmission from the lidar sensor system 102 of the modulated optical signal (or a portion thereof) outputted by the semiconductor optical amplifier 304 can be extended to scenarios in which the modulated optical signal is further amplified prior to transmission.

The lidar sensor system 102 can further include a combiner 306 (e.g., an interferometer) configured to receive a second portion of the input optical signal from the laser 302 (e.g., a local oscillator) as well as a returned optical signal received responsive to transmission of at least a portion of the modulated optical signal. The combiner 306 can coherently mix the second portion of the input optical signal with the returned optical signal. The returned optical signal can be mixed with the local oscillator (e.g., the second portion of the input optical signal) by the combiner 306, where the local oscillator was not modulated or amplified by the semiconductor optical amplifier 304. For instance, the combiner 306 can mix an electric field of the returned optical signal with an electric field of the local oscillator. Further, the combiner 306 can output mixed optical signals. Two mixed optical signals can be outputted by the combiner 306.

As noted above, the second portion of the input optical signal emitted by the laser source 302 can be used as the local oscillator during a detection process (e.g., by the combiner 306). Accordingly, a relatively small portion of the optical power of the continuous wave input optical signal emitted by the laser source 302 can be taped out from the laser source 302 to the combiner 306, while a larger portion of the optical power can be used to seed the semiconductor optical amplifier 304 (e.g., the first portion of the input optical signal). Moreover, an intensity of the second portion of the input optical signal (e.g., the local oscillator) to be coherently mixed with the returned optical signal can be unmodulated.

Moreover, the lidar sensor system 102 can include a balanced detector 308 configured to detect the mixed optical signals and generate an output signal. The output signal generated by the balanced detector 308 can be a differential photocurrent. The differential photocurrent can include the modulation of the returned optical signal (e.g., received responsive to the modulated optical signal being reflected by the target 106, the modulation of the modulated optical signal). Moreover, the local oscillator optical power (a direct current (DC) part of the local oscillator) can be removed by the balanced detector 308 (e.g., the output signal can lack the local oscillator optical power). Removing the local oscillator optical power, for instance, can mitigate relative intensity noise (RIN) of the local oscillator (e.g., noise caused by the laser source 302) in the output signal, which can enhance a resulting signal to noise ratio.

The lidar sensor system 102 can further include a pulse generator 310 configured to apply a pulsed signal to the semiconductor optical amplifier 304 to modulate the gain of the semiconductor optical amplifier 304. As noted above, the semiconductor optical amplifier 304 can have the gain modulated through current injection (e.g., caused by the pulsed signal). As opposed to conventional pulsed lidar architectures used in various traditional autonomous vehicle technologies where a laser source is intensity modulated, the laser source 302 of the lidar sensor system 102 can be unmodulated in order to preserve spectral purity and dynamics. Rather, the semiconductor optical amplifier 304 can be driven by the pulsed signal from the pulse generator 310 having a square modulation format at a relatively high speed (e.g., on the order of gigahertz, limited by a carrier's dynamics). Moreover, pulse widths can reach about a few nanoseconds width with approximately 100th picosecond rise time.

The lidar sensor system 102 can further include a timing system 312 and processing circuitry 314. The timing system 312 can be configured to measure a time of flight based at least in part on the output signal generated by the balanced detector 308. The timing system 312 can measure the time of flight further based on a signal outputted by the semiconductor optical amplifier 304 (e.g., a portion of the modulated optical signal), a signal outputted by the pulse generator 310, or the like. The timing system 312 can compare pulses in signals to thresholds to start and stop the time of flight measurement, for example. According to another example, the timing system 312 can perform pattern matching to start and stop the time of flight measurement. The processing circuitry 314 can be configured to determine a distance to the target 106 in the environment nearby the lidar sensor system 102 based on the time of flight measured by the timing system 312. For instance, the processing circuitry 314 can compute the distance to the target 106 from the lidar sensor system 102 based on the output from the timing system 312 and a speed of light in a medium through which the modulated optical signal propagates.

The lidar sensor system 102 can further include front end optics 316 configured to transmit, into an environment of the lidar sensor system 102, at least a portion of the modulated optical signal outputted by the semiconductor optical amplifier 304. According to various examples, the front end optics 316 can include a scanner configured to direct the modulated optical signal over a field of view in the environment. The front end optics 316 can also include other optical elements, such as one or more lenses, an optical isolator, one or more waveguides, an optical amplifier, and so forth. Such optical elements can enable generating an optical signal with desired properties such as collimation, divergence angle, linewidth, power, and the like. Such optical elements may be assembled discretely, integrated on a chip, or a combination of both. The front end optics 316 can also be configured to receive a reflected optical signal from the environment (e.g., the returned optical signal). The returned optical signal can correspond to at least a part of the modulated optical signal transmitted into the environment that reflected off the target 106 in the environment.

As described in various embodiments set forth herein, it is contemplated that the lidar sensor system 102 can include an integrated circuit 318 (e.g., an integrated photonic chip). Various components shown as being part of the lidar sensor system 102 can be included as part of the integrated circuit 318. For instance, as depicted in FIG. 1, the integrated circuit 318 can include the laser source 302, the semiconductor optical amplifier 304, the pulse generator 310, the combiner 306, and the balanced detector 308; further, as shown, the timing system 312, the processing circuitry 314, and the front end optics 316 of the lidar sensor system 102 can be separate from the integrated circuit 318. According to another embodiment, the integrated circuit 318 can include the laser source 302, the semiconductor optical amplifier 304, the combiner 306, and the balanced detector 308 (e.g., the pulse generator 310 can be separate from the integrated circuit 318). However, in other embodiments, it is contemplated that one or more of the elements shown as being included as part of the integrated circuit 318 can alternatively be discrete components (e.g., the lidar sensor system 102 can include discrete components without an integrated circuit).

Further, it is contemplated that the lidar sensor system 102 (or a portion thereof) can be replicated on a chip. For example, the integrated circuit 318 can include a first laser source, a first semiconductor optical amplifier, a first combiner, and a first balanced detector. The integrated circuit 318 can also include a second laser source, a second semiconductor optical amplifier, a second combiner, and a second balanced detector. The first laser source and the second laser source can use a common wavelength or different wavelengths.

Figure 4:
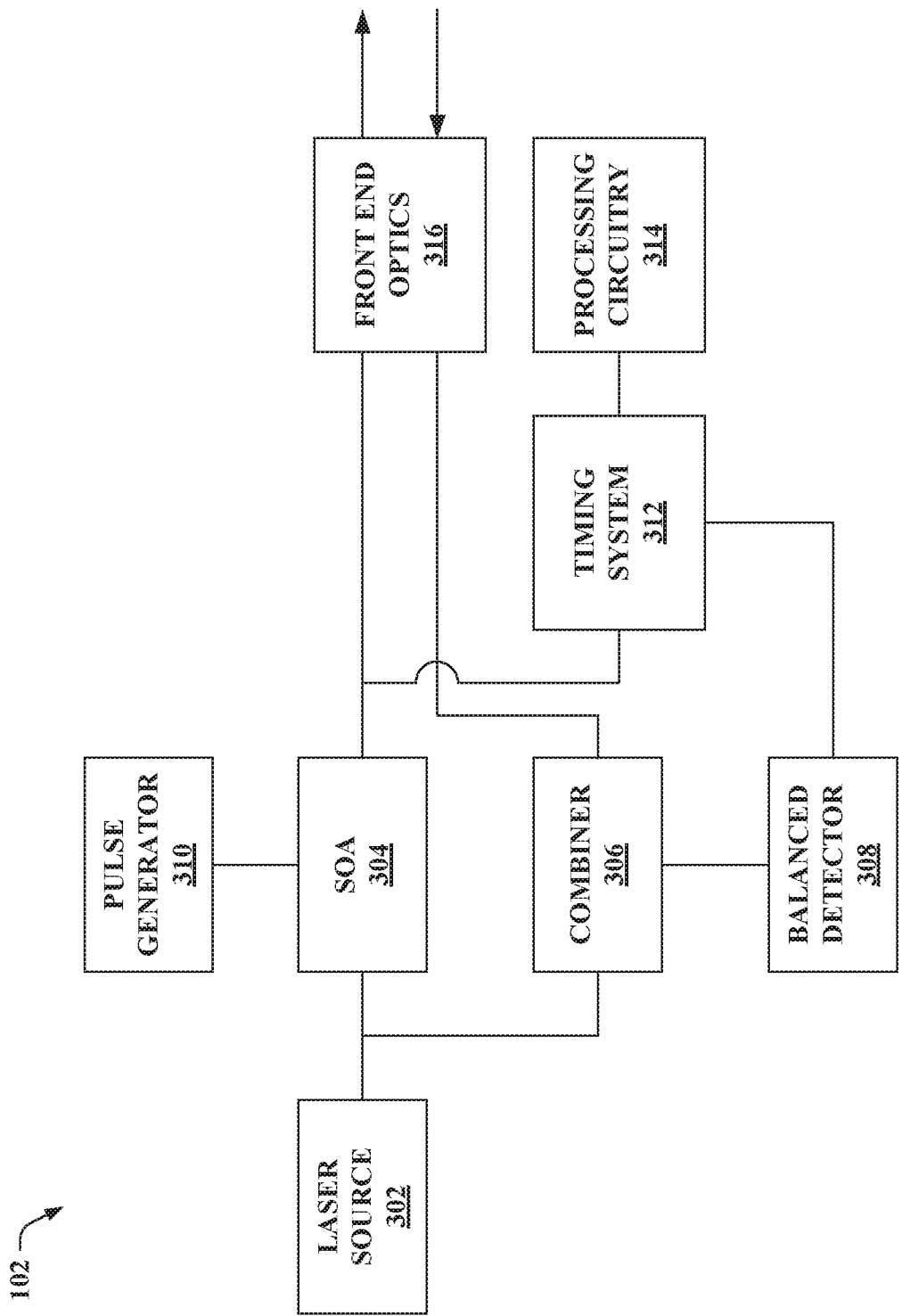
FIG. 4 illustrates a block diagram of an exemplary embodiment of the lidar sensor system of FIG. 3.

Now turning to FIG. 4, illustrated is an example of the lidar sensor system 102 according to various embodiments. As described herein, the lidar sensor system 102 includes the laser source 302, the pulse generator 310, the semiconductor optical amplifier 304, the combiner 306, and the balanced detector 308. Moreover, the lidar sensor system 102 can include the timing system 312, the processing circuitry 314, and the front end optics 316.

In the example of FIG. 4, the timing system 312 can be configured to measure a time of flight based on a signal outputted by the semiconductor optical amplifier 304 and a signal outputted by the balanced detector 308. The semiconductor optical amplifier 304 can amplify and modulate a portion of the input optical signal received from the laser source 302 to output a modulated optical signal. A first portion of the modulated optical signal outputted by the semiconductor optical amplifier 304 can be provided to the front end optics 316 for transmission into an environment nearby the lidar sensor system 102. Moreover, a second portion of the modulated optical signal outputted by the semiconductor optical amplifier 304 can be utilized by the timing system 312 to measure the time of flight. The second portion of the modulated optical signal can cause the timing system 312 to start the measurement of the time of flight. Further, as noted herein, the combiner 306 can receive and coherently mix the local oscillator and the returned optical signal received responsive to transmission of the first portion of the modulated optical signal. Further, the combiner 306 can output mixed optical signals, and the balanced detector 308 can detect the mixed optical signals and generate the output signal. The output signal from the balanced detector 308 can cause the timing system 312 to stop the measurement of the time of flight. A duration of time from starting the measurement to stopping the measurement can be detected and used by the processing circuitry 314 to determine a distance to a target in the environment.

Figure 5:
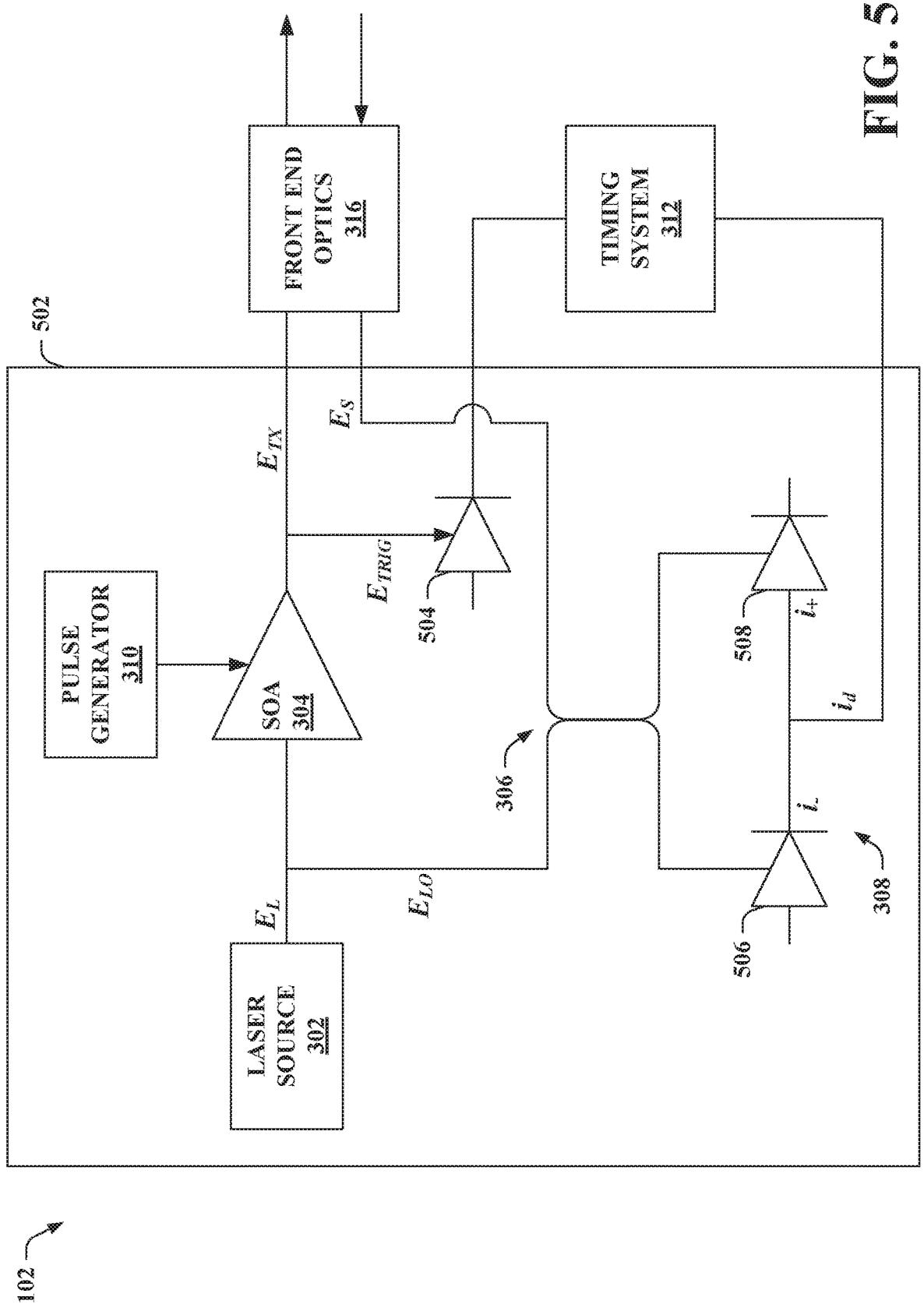
FIGS. 5-6 illustrate exemplary embodiments of the lidar sensor system of FIG. 3.

With reference to FIG. 5, illustrated is another exemplary embodiment of the lidar sensor system 102. The lidar sensor system 102 depicted in FIG. 5 includes an integrated circuit 502 (e.g., the integrated circuit 318). The integrated circuit 502 includes the laser source 302, the pulse generator 310, the semiconductor optical amplifier 304, the combiner 306, and the balanced detector 308. The lidar sensor system 102 can further include the timing system 312 and the front end optics 316, which are separate from the integrated circuit 502. Although not shown, the lidar sensor system 102 can also include the processing circuitry 314. For instance, the timing system 312 and the front end optics 316 (and the processing circuitry 314) can be discrete components, included as part of separate integrated circuit(s), a combination thereof, or the like.

As depicted, the lidar sensor system 102 (e.g., the integrated circuit 502) can also include a photodetector 504. The photodetector 504 can be a PIN photodiode. The photodetector 504 can be configured to receive a portion of the modulated optical signal outputted by the semiconductor optical amplifier 304. For instance, the modulated optical signal outputted by the semiconductor optical amplifier 304 can be split such that a first portion of the modulated optical signal is directed off-chip (e.g., transmitted from the lidar sensor system 102 towards a target via the front end optics 316) and a second portion of the modulated optical signal is inputted to the photodetector 504. The photodetector 504 can be triggered by the second portion of the modulated optical signal to cause the timing system 312 to start a measurement of the time of flight. Thus, a portion of the signal outputted by the semiconductor optical amplifier 304 can be used to trigger the photodetector 504, which can start the electronic timing system 312. As noted herein, the timing system 312 can stop the measurement of the time of flight based on the output signal generated by the balanced detector 308.

The combiner 306 can include a coupler with a 180 degree phase shift. To increase detection sensitivity of an attenuated signal and to avoid use of APDs, the lidar sensor system 102 can utilize a coherent detection scheme (e.g., using the combiner 306). An unmodulated local oscillator signal (e.g., the second portion of the input optical signal emitted by the laser source 302) can be coherently mixed with the returned optical signal using the coupler with the 180 degree phase shift (e.g., a 3 dB coupler with a 180 degree phase shift). The local oscillator is not optically amplified, which can preserve its degradation from the amplified spontaneous emission (ASE) noise of the semiconductor optical amplifier 304. Moreover, the two mixed output signals generated by the combiner 306 can be inputted to the balanced detector 308.

The balanced detector 308 can include a first photodetector 506 and a second photodetector 508. The first photodetector 506 can be a first PIN photodiode and the second photodetector 508 can be a second PIN photodiode. The first photodetector 506 and the second photodetector 508 can detect the mixed optical signals and generate the output signal. For instance, the output signal can be a differential photocurrent. Thus, the two mixed signals at the outputs of the combiner 306 can be detected using the photodetectors 506-508 and the differential photocurrent can be generated, which can include the amplified return signal free from relative intensity noise (RIN) of the local oscillator signal. The local oscillator optical power can be sufficiently high to lift the main signal from the non-cancellable noises such as thermal noise, thermal noise of the low noise amplifier (LNA), and shot noise. If the differential photocurrent satisfies a predefined threshold level as determined by the timing system 312, then the timing system 312 can stop the measurement of the time of flight. Moreover, a delay can be extracted (e.g., by the processing circuitry 314) from starting to stopping the measurement of the time of flight to determine a distance to the target in the environment nearby the lidar sensor system 102.

The lidar sensor system 102 can be modeled as follows. The laser source 302 can emit the input optical signal having a laser electric field, $E_L$. The laser electric field can be represented as:

$$E_L = \sqrt{P_L} e^{i(\omega_L t + \varphi_L)}$$

The input optical signal can be split, such that a first portion is inputted to the semiconductor optical amplifier 304 and a second portion is used as the local oscillator. A local oscillator electric field, $E_{LO}$, can be represented as:

$$E_{LO} = \sqrt{\eta P_L} e^{i(\omega_L t + \varphi_L)} = \sqrt{P_{LO}} e^{i(\omega_L t + \varphi_L)}$$

The modulated optical signal outputted by the semiconductor optical amplifier 304 can be split into a first portion to be transmitted into an environment nearby the lidar sensor system 102 having an electric field of a transmitted beam, $E_{TX}$, and a second portion having an electric field, $E_{TRIG}$. The electric field of the transmitted beam can be represented as:

$$E_{TX} = \text{rect}(t)\sqrt{(1-\eta)GP_L} e^{i(\omega_L t + \varphi_L)} + E_{sp} = \text{rect}(t)\sqrt{P_{TX}} e^{i(\omega_L t + \varphi_L)} + E_{sp}$$

Further, a square pulse shaped (e.g., as controlled by the pulse generator 310) can be defined as:

$$\text{rect}(t) = \begin{cases} 1 & |t| < T_p/2 \\ 1/2 & |t| = T_p/2 \\ 0 & |t| > T_p/2 \end{cases}$$

An electric field of the returned optical signal reflected back from the target, $E_S$, can be represented as:

$$E_s = \text{rect}(t-\tau)\sqrt{\alpha(R)P_{TX}} e^{i(\omega_L t + \varphi'_L)} + \sqrt{\alpha(R)} E_{sp} \approx \text{rect}(t-\tau)\sqrt{P_s} e^{i(\omega_L t + \varphi'_L)}$$

Moreover, a photocurrent of each of the photodetectors 506-508 can be:

$$i_{\pm} \approx \frac{\mathfrak{R}}{2}\left[P_{LO} \pm 2\text{rect}(t-\tau)\sqrt{P_{LO}P_S}\cos(\varphi_L - \varphi'_L)\right]$$

Further, a differential photocurrent outputted by the balanced detector 308, id, can be:

$$i_d \approx 2\mathfrak{R}\,\text{rect}(t-\tau)\sqrt{P_{LO}P_S}\cos(\varphi_L - \varphi'_L)$$

Accordingly, a signal to noise ratio (SNR) can be:

$$SNR \approx \frac{\mathfrak{R}P_s}{eB_e}$$

In the foregoing, $P_L$ is laser optical power, $P_{LO}$ is local oscillator optical power, $P_S$ is optical power of the returned optical signal from the target, $\eta$ is splitting efficiency ($0 \leq \eta \leq 1$), G is gain of the semiconductor optical amplifier 304, $E_L$ is laser electric field, $\omega_L$ is angular frequency, $\varphi_L$ is phase, $E_{LO}$ is local oscillator electric field, $E_{sp}$ is spontaneous emission electric field generated by the semiconductor optical amplifier 304, $E_{TX}$ is electric field of transmitted beam, $E_S$ is electric field of the signal reflected back from the target, $T_p$ is pulse width, $\alpha(R)$ is optical attenuation factor experienced by the optical beam propagating in free-space and reflected back by the target, $i_\pm$ is photocurrent of each photodetector 506-508, $\mathfrak{R}$ is responsivity of the photodetectors 506-508, $B_e$ is detection bandwidth, e is electron charge, and SNR is signal to noise ratio.

Figure 6:
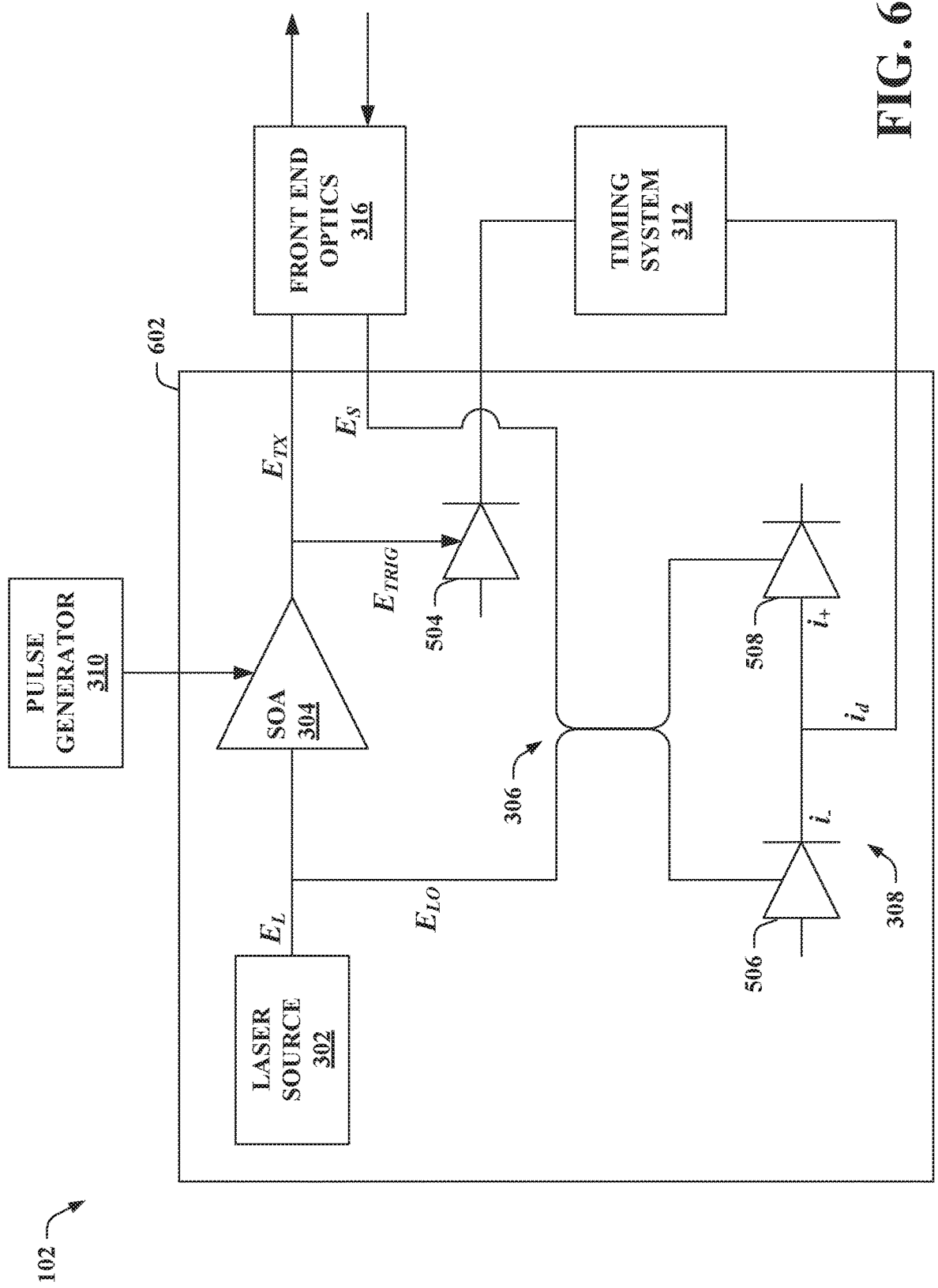

With reference to FIG. 6, illustrated is another exemplary embodiment of the lidar sensor system 102. As shown in FIG. 6, the lidar sensor system 102 includes an integrated circuit 602 (e.g., the integrated circuit 318). The integrated circuit 602 includes the laser source 302, the semiconductor optical amplifier 304, the combiner 306, and the balanced detector 308. In the example shown in FIG. 6, the pulse generator 310 can be separate from the integrated circuit 602. Likewise, the timing system 312 and the front end optics 316 can be separate from the integrated circuit 602. Again, although not shown, it is contemplated that the lidar sensor system 102 can also include the processing circuitry 314.

According to an example, the pulse generator 310 separate from the integrated circuit 602 can be a discrete element. Pursuant to another example, the lidar sensor system 102 of FIG. 6 can include a second integrated circuit, which can include the pulse generator 310.

Figure 7:
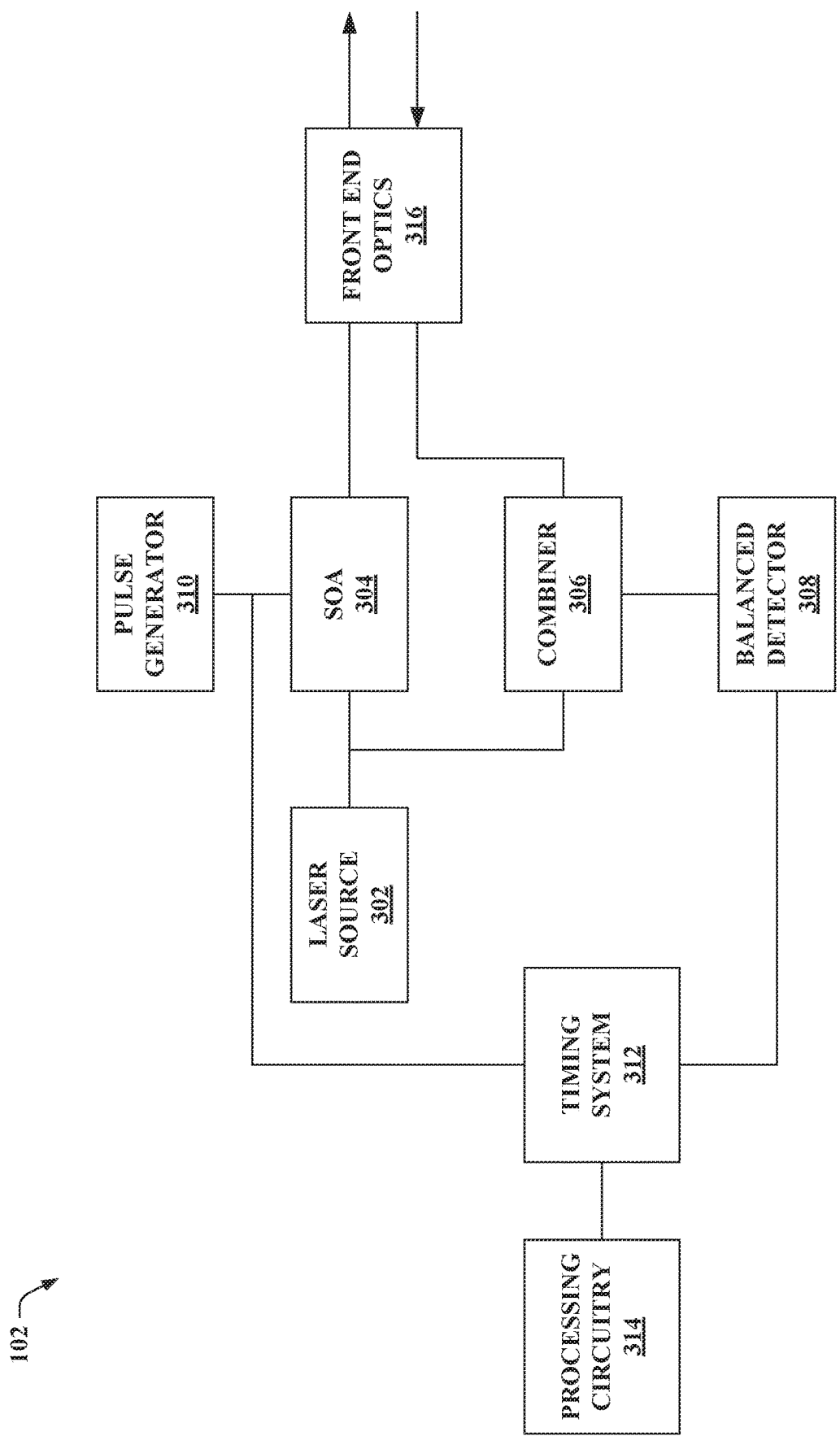
FIG. 7 illustrates a block diagram of another exemplary embodiment of the lidar sensor system of FIG. 3.

Now turning to FIG. 7, illustrated is yet another exemplary embodiment of the lidar sensor system 102. The lidar sensor system 102 again includes the laser source 302, the semiconductor optical amplifier 304, the combiner 306, the balanced detector 308, and the pulse generator 310. The lidar sensor system 102 can further include the timing system 312, the processing circuitry 314, and the front end optics 316.

As described herein, the pulse generator 310 can be configured to apply a pulsed signal to the semiconductor optical amplifier 304 to modulate the gain of the semiconductor optical amplifier 306. Moreover, the timing system 312 can start a measurement of the time of flight based on the pulsed signal from the pulse generator 310. The timing system 312 can further stop the measurement of the time of flight based on the output signal generated by the balanced detector 308.

Although not shown, it is again contemplated that the lidar sensor system 102 of FIG. 7 can include an integrated circuit. The integrated circuit, for example, can include the laser source 302, the semiconductor optical amplifier 304, the combiner 306, and the balanced detector 308. Moreover, the pulse generator 310 can be included as part of the integrated circuit in various embodiments. However, in other embodiments, the pulse generator 310 can be separate from the integrated circuit that includes the laser source 302, the semiconductor optical amplifier 304, the combiner 306, and the balanced detector 308.

Figure 8:
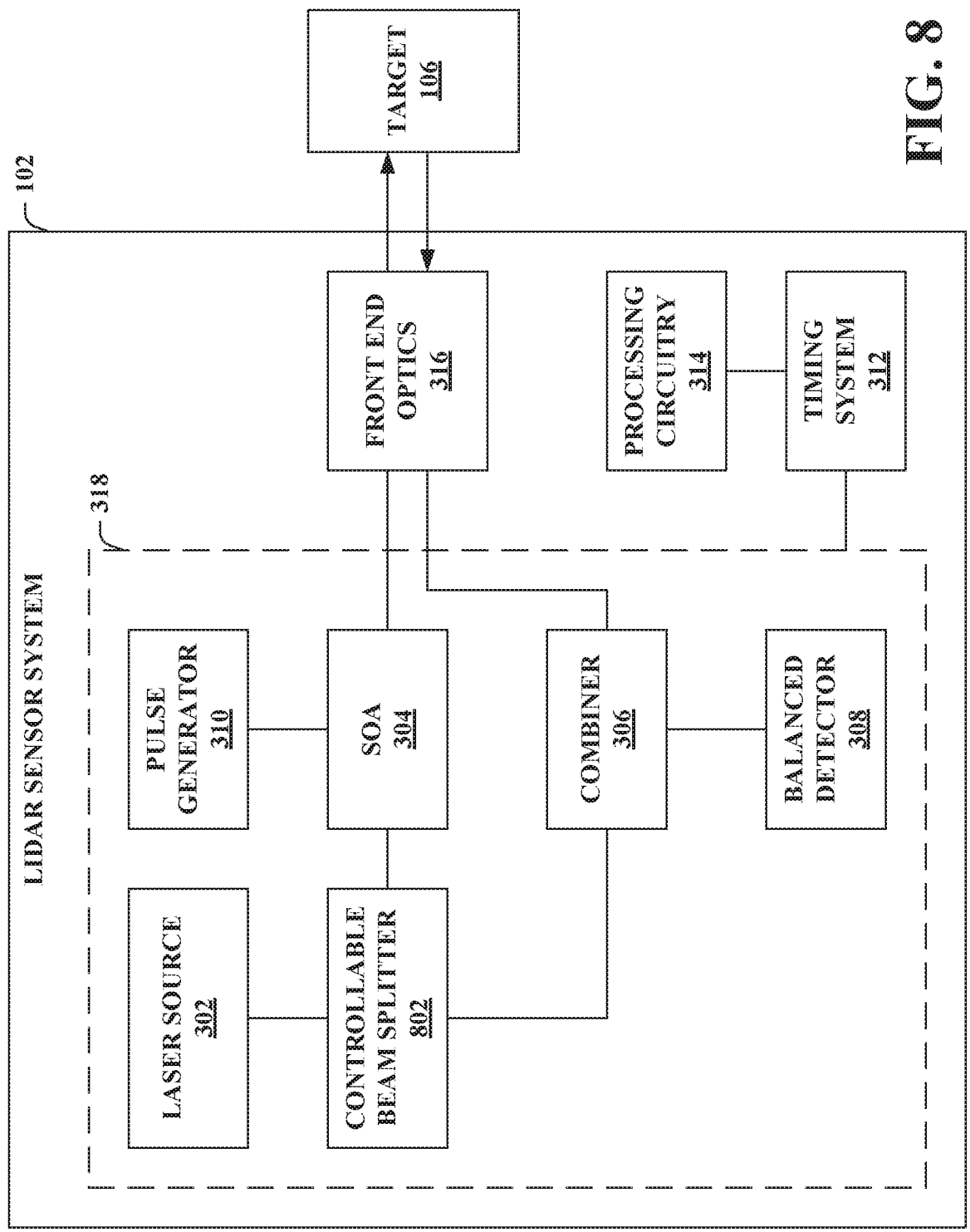
FIG. 8 illustrates a block diagram of yet another exemplary embodiment of the lidar sensor system of FIG. 3.

With reference to FIG. 8, illustrated is another exemplary embodiment of the lidar sensor system 102. Similar to above, the lidar sensor system 102 can include the laser source 302, the semiconductor optical amplifier 304, the combiner 306, the balanced detector 308, and the pulse generator 310. The lidar sensor system 102 can also include the timing system 312, the processing circuitry 314, and the front end optics 316. Further, as set forth above, the lidar sensor system 102 can include the integrated circuit 318 (e.g., the integrated circuit 502, the integrated circuit 602). As shown in FIG. 8, the lidar sensor system 102 can additionally include a controllable beam splitter 802; it is contemplated that the controllable beam splitter 802 can be included in any of the embodiments of the lidar sensor system 102 described herein.

The controllable beam splitter 802 can be configured to split the input optical signal received from the laser source 302 into the first portion of the input optical signal and the second portion of the input optical signal. The first portion of the input optical signal can be provided from the controllable beam splitter 802 to the semiconductor optical amplifier 304, and the second portion of the input optical signal (e.g., the local oscillator) can be provided from the controllable beam splitter 802 to the combiner 306. The controllable beam splitter 802 can control a power level of the first portion of the input optical signal (e.g., a trigger power) and a power level of the second portion of the input optical signal (e.g., local oscillator power). The controllable beam splitter 802 can be controlled to adjust a power split between the first portion of the input optical signal and the second portion of the input optical signal outputted by the controllable beam splitter 802. According to an example, the controllable beam splitter 802 can be or include a directional coupler.

Reference is now generally made to the lidar sensor system 102 described herein. Compared to various conventional time of flight lidar sensor systems, the lidar sensor system 102 can be a relatively compact and can have higher sensitivity. Moreover, the lidar sensor system 102 can have a high repetition rate. The pulse lidar sensor system 102 can include an integrated laser source, semiconductor optical amplifier, and photodetectors (e.g., PIN photodiodes) on a silicon photonics platform that allows optical guiding and signal manipulation using building blocks such as waveguides, directional couplers, filters, multimode interferences-based coupled, and so forth. The lidar sensor system 102 using the semiconductor optical amplifier 304 can provide optical amplification, a high modulation bandwidth, a high extinction ratio, and compactness. Moreover, a detection scheme of the lidar sensor system 102 can be based on balanced coherent detection techniques that can improve the detection signal to noise ratio compared to conventional lidar sensor systems that use a direct detection scheme.

Figure 9:
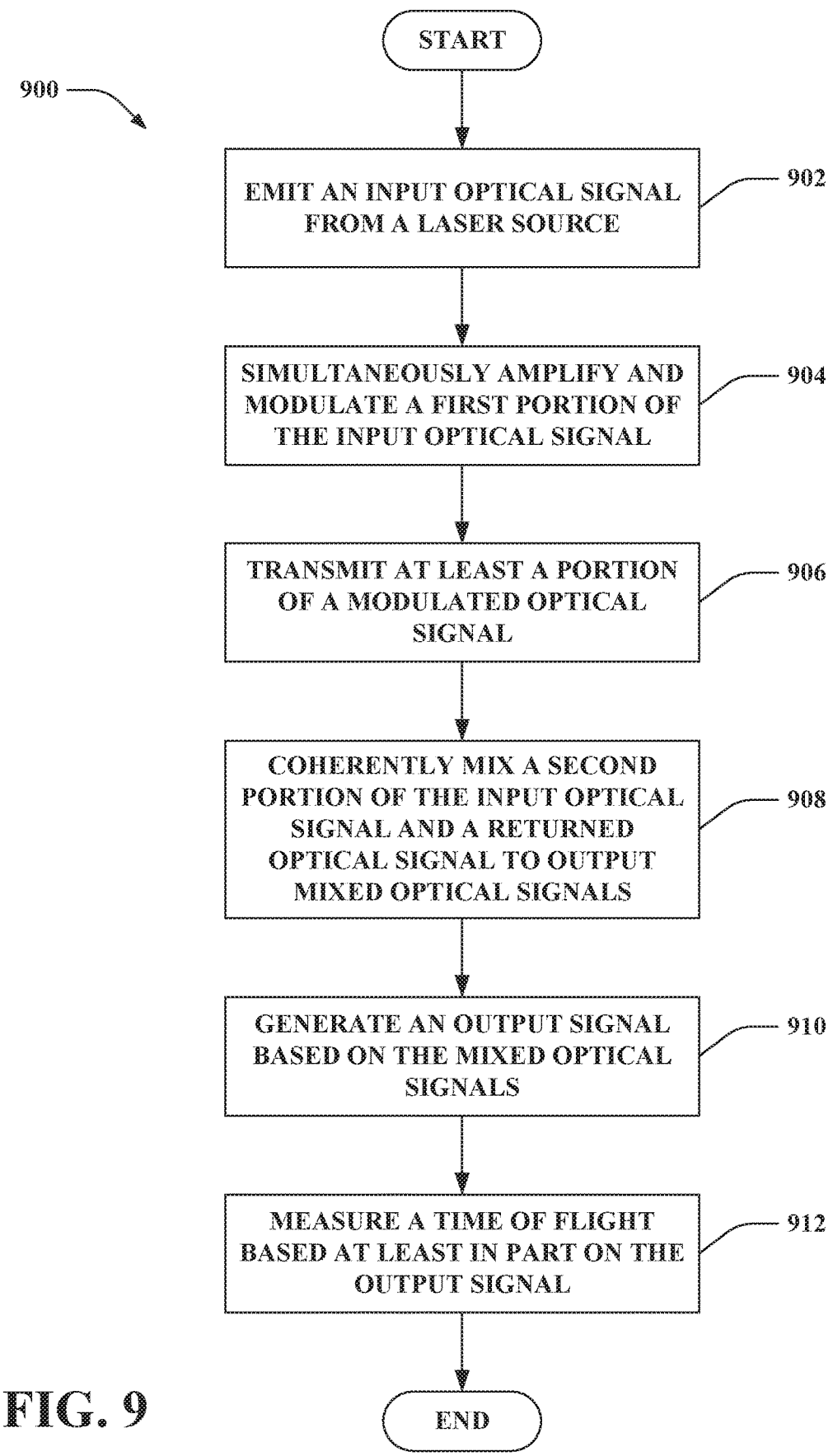
FIG. 9 is a flow diagram that illustrates an exemplary methodology of operating a lidar sensor system.

FIG. 9 illustrates an exemplary methodology related to operating a time of flight lidar sensor system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

FIG. 9 illustrates a methodology 900 of operating a lidar sensor system. At 902, an input optical signal can be emitted from a laser source of the lidar sensor system. At 904, a first portion of the input optical signal can be simultaneously amplified and modulated to generate a modulated optical signal. At 906, at least a portion of the modulated optical signal can be transmitted into an environment from the lidar sensor system. At 908, a second portion of the input optical signal and a returned optical signal received responsive to the transmission of the modulated optical signal into the environment can be coherently mixed to output mixed optical signals. At 910, an output signal (e.g., a differential photocurrent) can be generated based on the mixed optical signals. At 912, a time of flight can be measured based at least in part on the output signal. For instance, a distance to a target can be detected based on the measurement of the time of flight.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A lidar sensor system, comprising:
a laser source configured to emit an input optical signal;
a semiconductor optical amplifier configured to receive a first portion of the input optical signal and output a modulated optical signal, the semiconductor optical amplifier amplifies and modulates the first portion of the input optical signal to output the modulated optical signal;
a combiner configured to:
receive a second portion of the input optical signal and a returned optical signal received responsive to transmission of a first portion of the modulated optical signal;
coherently mix the second portion of the input optical signal with the returned optical signal; and
output mixed optical signals;
a balanced detector configured to detect the mixed optical signals and generate an output signal;
a photodetector configured to receive a second portion of the modulated optical signal outputted from the semiconductor optical amplifier; and
a timing system configured to measure a time of flight, wherein the photodetector is triggered by the second portion of the modulated optical signal outputted from the semiconductor optical amplifier to cause the timing system to start a measurement of the time of flight, and wherein the timing system stops the measurement of the time of flight based on the output signal generated by the balanced detector.

2. The lidar sensor system of claim 1, further comprising:
an integrated circuit, wherein the integrated circuit comprises the laser source, the semiconductor optical amplifier, the combiner, the balanced detector, and the photodetector.

3. The lidar sensor system of claim 1, further comprising:
a pulse generator configured to apply a pulsed signal to the semiconductor optical amplifier to modulate a gain of the semiconductor optical amplifier.

4. The lidar sensor system of claim 3, further comprising:
an integrated circuit, wherein the integrated circuit comprises the laser source, the semiconductor optical amplifier, the pulse generator, the combiner, the balanced detector and the photodetector.

5. The lidar sensor system of claim 1, wherein an intensity of the input optical signal emitted by the laser source is unmodulated.

6. The lidar sensor system of claim 1, wherein an intensity of the second portion of the input optical signal to be coherently mixed with the returned optical signal is unmodulated.

7. The lidar sensor system of claim 1, wherein the balanced detector comprises:
a first PIN photodiode; and
a second PIN photodiode;
wherein the first PIN photodiode and the second PIN photodiode detect the mixed optical signals and generate the output signal; and
wherein the output signal is a differential photocurrent.

8. The lidar sensor system of claim 1, wherein the combiner is a coupler with a 180 degree phase shift.

9. The lidar sensor system of claim 1 being a time of flight lidar sensor system.

10. The lidar sensor system of claim 1 being included in an autonomous vehicle.

11. The lidar sensor system of claim 1, further comprising:
a controllable beam splitter configured to split the input optical signal emitted by the laser source into the first portion of the input optical signal provided to the semiconductor optical amplifier and the second portion of the input optical signal provided to the combiner, wherein a power split between the first portion of the input optical signal and the second portion of the input optical signal outputted by the controllable beam splitter is adjustable.

12. An autonomous vehicle, comprising:
a lidar sensor system, comprising:
a laser source configured to emit an input optical signal;
a semiconductor optical amplifier configured to receive a first portion of the input optical signal and output a modulated optical signal, the semiconductor optical amplifier amplifies and modulates the first portion of the input optical signal to output the modulated optical signal;
a combiner configured to:
receive a second portion of the input optical signal and a returned optical signal received responsive to transmission of a first portion of the modulated optical signal into an environment nearby the autonomous vehicle;
coherently mix the second portion of the input optical signal with the returned optical signal; and
output mixed optical signals;
a balanced detector configured to detect the mixed optical signals and generate an output signal;
a photodetector configured to receive a second portion of the modulated optical signal outputted from the semiconductor optical amplifier; and
a timing system configured to measure a time of flight, wherein the photodetector is triggered by the second portion of the modulated optical signal outputted from the semiconductor optical amplifier to cause the timing system to start a measurement of the time of flight, and wherein the timing system stops the measurement of the time of flight based on the output signal generated by the balanced detector.

13. The autonomous vehicle of claim 12, wherein the lidar sensor system further comprises:
processing circuitry configured to determine a distance to a target in the environment nearby the autonomous vehicle based on the time of flight measured by the timing system.

14. The autonomous vehicle of claim 13, further comprising:
a computing system that is in communication with the lidar sensor system, wherein the computing system comprises:
a processor; and
memory that stores computer-executable instructions that, when executed by the processor, cause the processor to perform acts comprising:
controlling the autonomous vehicle based at least in part on the distance to the target in the environment nearby the autonomous vehicle.

15. The autonomous vehicle of claim 12, wherein the lidar sensor system further comprises:
a pulse generator configured to apply a pulsed signal to the semiconductor optical amplifier to modulate a gain of the semiconductor optical amplifier.

16. The autonomous vehicle of claim 12, wherein an intensity of the second portion of the input optical signal to be coherently mixed with the returned optical signal is unmodulated.

17. The autonomous vehicle of claim 12, wherein the combiner is a coupler with a 180 degree phase shift.

18. The autonomous vehicle of claim 12, wherein the lidar sensor system further comprises:
   an integrated circuit, wherein the integrated circuit comprises the laser source, the semiconductor optical amplifier, the combiner, the balanced detector, and the photodetector.

19. The autonomous vehicle of claim 12, wherein the lidar sensor system further comprises:
   a controllable beam splitter configured to split the input optical signal emitted by the laser source into the first portion of the input optical signal provided to the semiconductor optical amplifier and the second portion of the input optical signal provided to the combiner, wherein a power split between the first portion of the input optical signal and the second portion of the input optical signal outputted by the controllable beam splitter is adjustable.

20. A method of operating a lidar sensor system, comprising:
   emitting an input optical signal from a laser source of the lidar sensor system;
   simultaneously amplifying and modulating a first portion of the input optical signal to generate a modulated optical signal outputted by a semiconductor optical amplifier;
   transmitting a first portion of the modulated optical signal outputted by the semiconductor optical amplifier into an environment from the lidar sensor system;
   starting a measurement of a time of flight based on a second portion of the modulated optical signal outputted by the semiconductor optical amplifier;
   coherently mixing a second portion of the input optical signal and a returned optical signal received responsive to the transmission of the modulated optical signal into the environment to output mixed optical signals;
   generating an output signal based on the mixed optical signals; and
   stopping the measurement of the time of flight based on the output signal.

\* \* \* \* \*